United States Patent Office 3,422,121
Patented Jan. 14, 1969

3,422,121
PROCESS FOR THE PREPARATION OF 13-LOWER ALKYL-GONA-4,8(14),9-TRIENE-3,17-DIONE
David Taub, Metuchen, N.J., assignor to Merck & Co., Inc., Rahway, N.J., a corporation of New Jersey
No Drawing. Filed Aug. 13, 1965, Ser. No. 479,602
U.S. Cl. 260—397.3      2 Claims
Int. Cl. C07c 167/04; A61k 17/06

ABSTRACT OF THE DISCLOSURE

The invention disclosed herein is concerned generally with novel processes for the preparation of steroid compounds. More particularly, it relates to a novel process for producing 13-lower alkyl-4,8(14),9-gonatriene-3,17-dione steroids, valuable as intermediates useful in the preparation of compounds having utility as orally and parenterally active progrestational agents, starting with 2-methyl-5-oxo-4H-5,6,7,8-tetrahydro-chromene. In this process the said starting compound is reacted with a vinyl magneium halide to form 2-methyl-5-vinyl-5-hydroxy-4H-5,6,7,8-tetrahydro-chromene which is then reacted with a 2-lower alkylcyclopentane-1,3-dione to produce 3-methyl-13-lower alkyl-8,14-seco-4-oxagona-2,5(10),9(11)-triene-14,17-dione; the latter compound is treated with a strong acid thereby closing the C-ring to produce 3-methyl-13-lower alkyl-4-oxagona-2,5(10)8,14-tetraene-17-one which upon reaction with an aqueous solution of an organic acid is converted by the opening of the A-ring to 13-lower alkyl - 4,5 - secogona - 8,14 - diene - 3,5,17-trione; the last named compound is then reacted with an alkali metal alkoxide to close the A-ring and form the desired 13-lower alkyl-gona-4,8(14),9-triene-3,17-dione which, upon chloroethynylation, is converted to the highly active progrestational agent, 13-lower alkyl-17α-chloroethynyl-17β-hydroxy-gona-4,8(14),9-triene-3-one.

---

13-lower alkyl-17α-chloroethynyl-17β-hydroxy-4,8(14),9-gonatrien-3-one steroids which may be prepared from 13-lower alkyl-4,8(14),9-gonatriene - 3,17 - dione steroids have oral progrestational activity and because of this property may be used to regulate the estrus cycle in domestic animals and in cases of menstrual disturbances may be used to re-establish the normal relationships between the anteriorpituitary, ovary and endometrium which are present in a normal estrus cycle. They may also be used to synchronize the estrus cycles of a herd or colony of domestic animals or to chronically suppress estrus in domestic animals. When used for these purposes, they may be supplied together or in succession with an estrogenic hormone.

Because of their progesterone-like effect, 13-lower alkyl-17α - chloroethynyl - 17β-hydroxy-4,8(14),9-gonatriene-3-one steroids affect the secretion of gonadotropins and thus act to regulate ovulation and endometrial and placental development. When combined with estrogens or androgens, 13 - lower alkyl-17α-chloroethynyl-17β-hydroxy-4,8 (14),9-gonatrien-3-one steroids reduce fertility. 13-lower alkyl-17α-chloroethynyl-17β - hydroxy - 4,8(14),9 - gonatrien-3-one steroids also have utility in correcting disorder such as dysmenorrhea, amenorrhea, threatened abortion, endometriosis, and the like.

The method for the synthesis of 13-lower alkyl-4,8(14), 9-gonatriene-3,17-dione steroids, starting with 2-methyl-5-oxo-4H-5,6,7,8-tetrahydro chromene, may be schematically represented by the following series of reactions wherein R is a lower alkyl substituent, preferably having not more than five carbon atoms, such as methyl, ethyl, propyl, isopropyl, butyl, isobutyl, pentyl and isopentyl radicals:

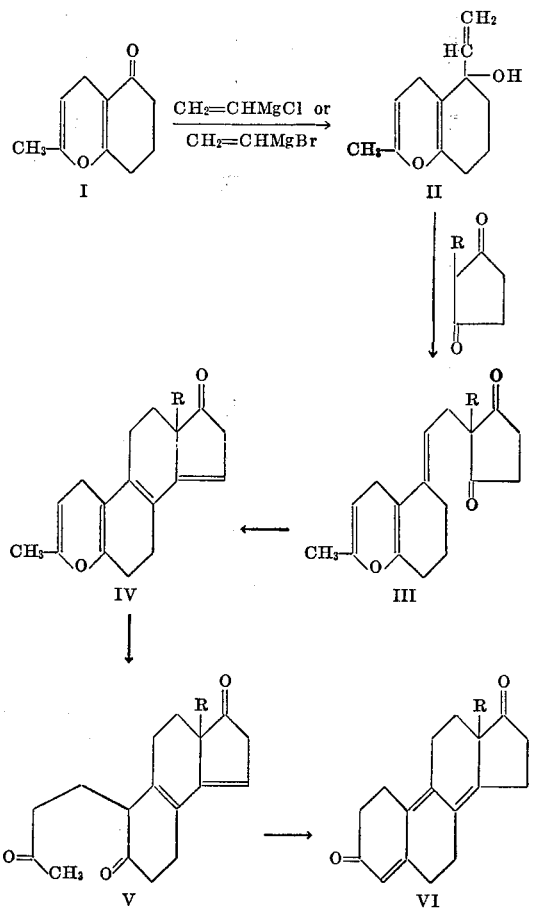

The starting material in the process of this invention is 2-methyl-5-oxo-4H-5,6,7,8-tetrahydro chromene (Compound I). The first step in the process is the reaction of Compound I with a vinyl magnesium halide to provide 2-methyl - 5 - vinyl - 5 - hydroxy - 4H - 5,6,7,8 - tetrahydro chromene (Compound II). The second step is the reaction of Compound II with a 2-lower alkyl-cyclopentane-1,3-dione to provide 3-methyl-13-lower alkyl-8,14-seco-4-oxagona-2,5(10),9(11)-triene-14,17-dione (Compound III). The third step is the treatment of Compound III with a strong acid, such as hydrogen chloride, phosphoric acid, sulfuric acid, or para-toluenesulfonic acid, to close the C-ring and provide 3 - methyl - 13 - lower alkyl - 4-oxagona-2, 5(10),8,14-tetraen-17-one (Compound IV). The fourth step is the opening of the A-ring of Compound IV by treatment with an aqueous solution of an organic acid, such as acetic acid, propionic acid or oxalic acid, to provide 13-lower alkyl-4,5-secogona-8,14-diene-3,5,17-trione (Compound V). The fifth step is the closure of the A-ring of Compound V to provide 13-lower alkyl-gona-4,9,8(14)-triene-3,17-dione (Compound VI). Closure of the A-ring of Compound V is accomplished by the treatment of Compound V with an alkali metal lower alkoxide. Chloroethynylation of 13-methylgona-4,9,8(14) - triene - 3,17 - dione to provide 17α - chloroethynyl-19-nor-4,8(14),9-androstratriene-17β-ol-3-one is described in J.A.C.S., vol. 85, page 1707, (1963).

The first step in the process for the preparation of 13-lower alkyl-4,8(14),9-gonatriene-3,17-dione steroids by the reaction of 2-methyl-5-oxo - 4H - 5,6,7,8 - tetrahydro chromene (Compound I) with vinyl magnesium halide, such as vinyl magnesium bromide or vinyl magnesium chloride, to produce 2-methyl-5-vinyl-5-hydroxy-4H-5,6,7,8-tetrahydro chromene (Compound II) may be conveniently accomplished by adding a solution of Compound I in tetrahydrofuran and ether to a solution of the vinyl magnesium halide in tetrahydrofuran, which is maintained at a temperature of about −5° C. The temperature of the reaction mixture is allowed to come to room temperature with stirring. The product is isolated by cooling the reaction mixture to below 0° C. and carefully adding saturated aqueous ammonium chloride solution. The inorganic slurry is separated from the organic layer and extracted with ether, the organic layer and the ether extract are combined, washed with aqueous potassium bicarbonate solution, dried over anhydrous sodium sulfate, and concentrated to dryness under reduced pressure. The residue is Compound II.

In the second step, the reaction of Compound II with 2-lower alkyl-cyclopentane-1,3-dione to provide 3-methyl-13-lower alkyl-8,14-seco-4-oxagona-2,5(10),9(11)-triene-14,17-dione (Compound III) may be accomplished by refluxing a solution of Compound II and 2-lower alkyl-cyclopentane-1,3-dione in xylene and tertiary-butanol under nitrogen. To isolate the reaction product, the reaction mixture is cooled, ether is added, the resulting slurry is washed with aqueous potassium bicarbonate solution and then with aqueous sodium chloride solution. The organic layer is dried over magnesium sulfate and concentrated to dryness under reduced pressure. The residue is Compound III.

Compound III is treated in a third step with a strong acid, such as hydrogen chloride, phosphoric acid, sulfuric acid or anhydrous para-toluenesulfonic acid, in solution in an anhydrous aromatic solvent, such as benzene, toluene or xylene, to close the C-ring and provide 3-methyl-13-lower alkyl - 4 - oxagona - 2,5(10),8,14-tetraen-17-one (Compound IV). The reaction mixture is maintained at a temperature of about 60° C. under a gentle stream of nitrogen for about 30 minutes. The reaction product may be conveniently isolated by cooling the reaction mixture and adding benzene. The organic phase is then separated, washed with dilute aqueous potassium bicarbonate solution, washed with saturated sodium chloride solution, dried over magnesium sulfate, and the solvent is removed under reduced pressure. The residue is Compound IV.

The A-ring of Compound IV is opened by heating a solution of Compound IV in an aqueous solution of an organic acid, such as aqueous acetic acid, propionic acid or oxalic acid, for about 3 hours to provide 13-lower alkyl-4,5-secogona-8,14-diene-3,5,17 - trione (Compound V). In order to isolate Compound V, the solution is cooled, and concentrated under reduced pressure to near dryness. Water is added to the concentrate and this mixture is extracted with chloroform. The chloroform extract is washed with dilute aqueous potassium bicarbonate solution, then with saturated aqueous sodium chloride solution, and dried over magnesium sulfate. The solvent is removed by distillation under reduced pressure. The residue is Compound IV.

Closure of the A-ring of Compound V, to provide Compound VI, may be accomplished by refluxing a solution of Compound V in a lower aliphatic alcohol, such as methanol or ethanol, containing an alkali metal lower alkoxide, such as sodium or potassium methoxide or sodium or potassium ethoxide, under nitrogen for about four hours. To isolate Compound VI, the reaction mixture is cooled, neutralized with a weak acid, such as dilute aqueus acetic acid, and concentrated under reduced pressure to near dryness. Water is added to the residue, the mixture is extracted with ether, the ether layer is washed with saturated aqueous sodium chloride solution, dried over magnesium sulfate and the ether is removed by distillation under reduced pressure. The residue is Compound VI.

The following examples illustrate methods of carrying out the present invention, but it is to be understood that these examples are given for purposes of illustration and not of limitation.

EXAMPLE 1

2-methyl-5-5vinyl-5-hydroxy-4H-5,6,7,8-tetrahydro chromene

Five grams of vinyl bromide in 5 ml. of tetrahydrofuran are added dropwise to a stirred suspension of 900 mg. of magnesium turnings and 9 ml. of tetrahydrofuran which is kept under nitrogen. During the addition the temperature is maintained at 50–60° C. The solution of Grignard reagent is cooled to −5° C. and a solution of 1.6 g. of 2-methyl-5-oxo-4H-5,6,7,8-tetrahydro chromane in 5 ml. of tetrahydrofuran and 15 ml. of ether is added over a period of 20 minutes. The mixture is stirred at room temperature for three hours and then cooled to −5° C. Fifteen milliliters of saturated aqueous ammonium chloride solution is added dropwise to the cooled reaction mixture. The inorganic slurry is separated from the organic layer and extracted with ether. The extract is added to the organic layer and the combined solution is washed with dilute aqueous potassium bicarbonate solution, dried over anhydrous sodium sulfate and concentrated to dryness under reduced pressure. The residue is 2-methyl-5-vinyl-5-hydroxy-4H - 5,6,7,8 - tetrahydro chromene.

EXAMPLE 2

3,13-dimethyl-8,14-seco-4-oxagona-2,5(10),9(11)-triene-14,17-dione

A solution of 840 mg. of 2-methyl-5-vinyl-5-hydroxy-4H-5,6,7,8-tetrahydro chromene and 540 mg. of 2-methylcyclopentane-1,3-dione in 6 ml. of xylene and 3 ml. of tertiarybutanol is refluxed under nitrogen for three hours. The reaction mixture is cooled, ether is added and the resulting slurry is washed with 5% aqueous potassium bicarbonate solution and then with saturated aqueous sodium chloride solution. The organic layer is dried over magnesium sulfate and concentrated to dryness under reduced pressure. The residue is 3,13-dimethyl-8,14-seco-4-oxagona-2,5(10),9(11)-triene-14,17-dione.

EXAMPLE 3

3-methyl-13-ethyl-8,14-seco-4-oxagona-2,5(10),9(11)-triene-14,17-dione

A solution of 840 mg. of 2-methyl-5-vinyl-5-hydroxy-4H,5,6,7,8-tetrahydro chromene and 540 mg. of 2-ethyl-cyclopentane-1,3-dione in 6 ml. of xylene and 3 ml. of tertiary-butanol is refluxed under nitrogen for three hours. The reaction mixture is cooled, ether is added and the resulting slurry is washed with 5% aqueous potassium bicarbonate solution and then with saturated aqueous sodium chloride solution. The organic layer is dried over magnesium sulfate and concentrated to dryness under reduced pressure. The residue is 3-methyl-13-ethyl-8,14-seco-4-oxagona-2, 5(10), 9(11)-triene-14,17-dione.

EXAMPLE 4

3-methyl-13-isopropyl-8,14-seco-4-oxagona-2,5 (10),9(11)-triene-14,17-dione

A solution of 840 mg. of 2-methyl-5-vinyl-5-hydroxy-4H-5,6,7,8-tetrahydro chromene and 540 mg. of 2-iso-propyl-cyclopentane-1,3-dione in 6 ml. of xylene and 3 ml. of tertiary-butanol is refluxed under nitrogen for three hours. The reaction mixture is cooled, ether is added and the resulting slurry is washed with 5% aqueous potassium bicarbonate solution and then with saturated aqueous sodium chloride solution. The organic layer is dried over magnesium sulfate and concentrated to dryness under reduced pressure. The residue is 3-methyl-13-isopropyl-8,14-seco-4-oxagona-2,5(10),9(11)-triene-14,17-dione.

EXAMPLE 5

3,13-dimethyl-4-oxagona-2,5(10),8,14-tetraene-17-one

A solution of 30 mg. of para-toluenesulfonic acid monohydrate in 10 ml. of benzene is concentrated to dryness at 60° C. under nitrogen. A solution of 560 mg. of 3,13-dimethyl - 8,14 - seco - 4 - oxagona - 2,5(10),9(11)-triene-14,17-dione in 10 ml. of anhydrous benzene is added to a solution of the anhydrous para-toluenesulfonic acid, prepared as above, in 5 ml. of anhydrous benzene. The reaction is maintained at a temperature of 60° C. under a gentle stream of nitrogen for 30 minutes. It is then cooled and 20 ml. of benzene and 20 ml. of water are added to the cooled reaction mixture. The organic phase of the reaction mixture is separated and washed with dilute aqueous potassium bicarbonate solution and then with satturated sodium chloride solution. The washed solution is dried over magnesium sulfate and the solvent is removed under reduced pressure. The residue is 3,13-dimethyl-4-oxagona-2,5(10),8,14-tetraene-17-one.

EXAMPLE 6

3-methyl-13-ethyl-4-oxagona-2,5(10),8,14-tetraene-17-one

A solution of 30 mg. of para-toluenesulfonic acid monohydrate in 10 ml. of benzene is concentrated to dryness at 60° C. under nitrogen. A solution of 560 mg. of 3-methyl - 13 - ethyl - 8,14 - seco-4-oxagona-2,5(10),9(11)-triene-14,17-dione in 10 ml. of anhydrous benzene is added to a solution of the anhydrous para-toluenesulfonic acid, prepared as above, in 5 ml. of anhydrous benzene. The reaction is maintained at a temperature of 60° C. under a gentle stream of nitrogen for 30 minutes. It is then cooled and 20 ml. of benzene and 20 ml. of water are added to the cooled reaction mixture. The organic phase of the reaction mixture is separated and washed with dilute aqueous potassium bicarbonate solution and then with saturated sodium chloride solution. The washed solution is dried over magnesium sulfate and the solvent is removed under reduced pressure. The residue is 3-methyl-13-ethyl-4-oxagona-2,5(10),8,14-tetraene-17-one.

EXAMPLE 7

3-methyl-13-isopropyl-4-oxagona-2,5(10),8,14-tetraene-17-one

A solution of 30 mg. of para-toluenesulfonic acid monohydrate in 10 ml. of benzene is concentrated to dryness at 60° C. under nitrogen. A solution of 560 mg. of 3-methyl - 13 - isopropyl - 8,14 - seco-4-oxagona-2,5(10),9(11)-triene-14,17-dione in 10 ml. of anhydrous benzene is added to a solution of the anhydrous para-toluenesulfonic acid, prepared as above, in 5 ml. of anhydrous benzene. The reaction is maintained at a temperature of 60° C. under a gentle stream of nitrogen for 30 minutes. It is then cooled and 20 ml. of benzene and 20 ml. of water are added to the cooled reaction mixture. The organic phase of the reaction mixture is separated and washed with dilute aqueous potassium bicarbonate solution and then with saturated sodium chloride solution. The washed solution is dried over magnesium sulfate and the solvent is removed under reduced pressure. The residue is 3-methyl - 13 - isopropyl - 4 - oxagona - 2,5(10),8,14 - tetraene-17-one.

EXAMPLE 8

13-methyl-4,5-secogona-8,14-diene-3,5,17-trione

A solution of 500 mg. of 3,13-dimethyl-4-oxagona-2,5(10),8,14-tetraene-17-one in 10 ml. of 50% aqueous acetic acid is heated to a temperature of 90–95° C. and maintained at that temperature for three hours. The solution is cooled and concentrated to near dryness under reduced pressure. Water and chloroform are added to the concentrate and the chloroform layer is removed and washed with 5% aqueous potassium bicarbonate solution and then with saturated aqueous sodium chloride solution. The washed chloroform solution is dried over magnesium sulfate and the chloroform is removed under reduced pressure. The residue is 13-methyl-4,5-secogona-8,14-diene-3,5,17-trione.

EXAMPLE 9

13-ethyl-4,5-secogona-8,14-diene-3,5,17-trione

A solution of 500 mg. of 3-methyl-13-ethyl-4-oxagona-2,5(10),8,14-tetraen-17-one in 10 ml. of 50% aqueous acetic acid is heated to a temperature of 90–95° C. and maintained at that temperature for three hours. The solution is cooled and concentrated to near dryness under reduced pressure. Water and chloroform are added to the concentrate and the chloroform layer is removed and washed with 5% aqueous potassium bicarbonate solution and then with saturated aqueous sodium chloride solution. The washed chloroform solution is dried over magnesium sulfate and the chloroform is removed under reduced pressure. The residue is 13-ethyl-4,5-secogona-8,14-diene-3,5,17-trione.

EXAMPLE 10

13-isopropyl-4,5-secogona-8,14-diene-3,5-17-trione

A solution of 500 mg. of 3-methyl-13-isopropyl-4-oxagona-2,5(10),8,14-tetraen-17-one in 10 ml. of 50% aqueous acetic acid is heated to a temperature of 90–95° C. and maintained at that temperature for three hours. The solution is cooled and concentrated to near dryness under reduced pressure. Water and chloroform are added to the concentrate and the chloroform layer is removed and washed with 5% aqueous potassium bicarbonate solution and then with saturated aqueous sodium chloride solution. The washed chloroform solution is dried over magnesium sulfate and the chloroform is removed under reduced pressure. The residue is 13-isopropyl-4,5-secogona-8,14-diene-3,5,17-trione.

EXAMPLE 11

13-methylgona-4,9,8(14)-triene-3,17-dione

A solution of 200 mg. of 13-methyl-4,5-secogona-8,14-diene-3,5,17-trione in 20 ml. of methanol containing 0.4 g. of sodium methoxide is refluxed under nitrogen for four hours. The reaction mixture is cooled, neutralized with 15% aqueous acetic acid solution and then concentrated to near dryness under reduced pressure. Water is added to the concentrate and the resulting mixture is extracted with ether. The ether layer is removed, washed with saturated aqueous sodium chloride solution, and dried over magnesium sulfate. The ether is removed by distillation under reduced pressure. The residue is 13-methylgona-4,9,8(14)-triene-3,17-dione and is purified by chromatography on magnesium silicate (Florisil).

EXAMPLE 12

13-ethyl-gona-4,9,8(14)-triene-3,17-dione

A solution of 200 mg. of 13-ethyl-4,5-secogona-8,14-diene-3,5,17-trione in 20 ml. of methanol containing 0.4 g. of sodium methoxide is refluxed under nitrogen for four hours. The reaction mixture is cooled, neutralized with 15% aqueous acetic acid solution and then concentrated to near dryness under reduced pressure. Water is added to the concentrate and the resulting mixture is extracted with ether. The ether layer is removed, washed with saturated aqueous sodium chloride solution, and dried over magnesium sulfate. The ether is removed by distillation under reduced pressure. The residue is 13-ethyl-gona-4,9,8(14)-triene-3,17-dione and is purified by chromatography on magnesium silicate (Florisil).

EXAMPLE 13

13-isopropyl-gona-4,9,8(14)-triene-3,17-dione

A solution of 200 mg. of 13-isopropyl-4,5-secogona-8,14-diene-3,5,17-trione in 20 ml. of methanol containing 0.4 g. of sodium methoxide is refluxed under nitrogen for four hours. The reaction mixture is cooled, neutralized with 15% aqueous acetic acid solution and then concentrated to near dryness under reduced pressure. Water is added to the concentrate and the resulting mixture is extracted with ether. The ether layer is removed, washed with saturated aqueous sodium chloride solution, and dried over magnesium sulfate. The ether is removed by distillation under reduced pressure. The residue is 13-isopropyl-gone-4,9,8(14)-triene-3,17-dione and is purified by chromatography on magnesium silicate (Florisil).

Various changes and modifications may be made in carrying out the present invention without departing from the spirit and scope thereof. Insofar as these changes and modifications are within the purview of the annexed claims, they are to be considered as part of our invention.

What is claimed is:

1. A process for the preparation of 13-lower alkyl-gona-4,9,8(14)-triene-3,17-dione which comprises the steps of reacting 2-methyl-5-oxo-4H-5,6,7,8-tetrahydro chromene with a vinyl magnesium halide to provide 2-methyl - 5 - vinyl - 5 - hydroxy - 4H - 5,6,7,8 - tetrahydro chromene, reacting 2-methyl-5-vinyl-5-hydroxy-4H-5,6,7,8-tetrahydro chromene with 2-lower alkyl-cyclopentane-1,3-dione to provide 3-methyl-13-lower alkyl-8,14-seco-4-oxagona - 2,5(10),9(11)-triene-14,17-dione, reacting 3-methyl - 13 - lower alkyl - 8,14 - seco - 4 - oxagona - 2,5(10),9(11)-triene-14,17-dione with a strong acid to provide 3 - methyl - 13 - lower alkyl-4-oxagona-2,5(10),8,14-tetraen-17-one, reacting 3-methyl-13-lower alkyl-4-oxagona-2,5(10),8,14-tetraen-17-one with an aqueous solution of an organic acid to provide 13-lower alkyl-4,5-secogona-8,14-diene-3,5,17-trione, and reacting 13-lower alkyl-4,5-secogona-8,14-diene-3,5,17-trione with an alkali metal lower alkoxide.

2. A process for the preparation of 13-lower alkyl-gona-4,9,8(14)-triene-3,17-dione which comprises the steps of reacting 2-methyl-5-oxo-4H-5,6,7,8-tetrahydro chromene with vinyl magnesium bromide in solution in tetrahydrofuran to provide 2-methyl-5-vinyl-5-hydroxy-4H-5,6,7,8-tetrahydro chromene, refluxing a solution of 2 - methyl-5-vinyl-5-hydroxy-4H-5,6,7,8-tetrahydro chromene in xylene and tertiary-butanol containing 2-lower alkylcyclopentane-1,3-dione under nitrogen to provide 3-methyl - 13 - lower alkyl - 8,14-seco-4-oxagona-2,5(10),9(11)-triene-14,17-dione, reacting a solution of 3-methyl-13-lower alkyl-8,14-seco-4-oxagona-2,5(10),9(11)-triene-14,17-dione in benzene with para-toluenesulfonic acid to provide 3 - methyl - 13 - lower alkyl-4-oxagona-2,5(10),8,14-tetraen-17-one, heating 3-methyl-13-lower alkyl-4-oxagona-2,5(10),8,14-tetraen-17-one in an aqueous solution of acetic acid to provide 13-lower alkyl-4,5-secogona-8,14-diene-3,5,17-trione, and refluxing a solution of 13-lower alkyl - 4,5 - secogona - 8,14 - diene-3,5,17-trione in methanol containing sodium methoxide under nitrogen.

References Cited

UNITED STATES PATENTS 3,102,145 8/1963 Nomine et al. ____ 260—397.45
3,248,294 8/1966 Nomine et al. ____ 260—397.45

ELBERT L. ROBERTS, *Primary Examiner.*

U.S. Cl. X.R.

260—345.2, 397.4, 586; 424—240